US006928464B2

(12) United States Patent
Appiah et al.

(10) Patent No.: US 6,928,464 B2
(45) Date of Patent: Aug. 9, 2005

(54) SYSTEMS AND METHODS FOR UNIFIED REMOTE CONTROL ACCESS

(75) Inventors: Madan Mohan R. Appiah, Sammamish, WA (US); Huei Chung Wang, Redmond, WA (US); Tad D. Brockway, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 814 days.

(21) Appl. No.: 09/845,808

(22) Filed: Apr. 30, 2001

(65) Prior Publication Data

US 2002/0161895 A1 Oct. 31, 2002

(51) Int. Cl.$^7$ .............................................. G06F 15/16
(52) U.S. Cl. ...................... 709/204; 709/225; 709/227; 709/228; 709/230
(58) Field of Search ................................. 709/204, 206, 709/708, 209, 210, 211, 225, 227, 228, 229, 230

(56) References Cited

U.S. PATENT DOCUMENTS

| | | | |
|---|---|---|---|
| 5,546,584 A | * | 8/1996 | Lundin et al. .............. 719/315 |
| 5,572,582 A | * | 11/1996 | Riddle ................... 379/202.01 |
| 5,768,525 A | * | 6/1998 | Kralowetz et al. .......... 709/228 |
| 5,884,032 A | * | 3/1999 | Bateman et al. ............ 709/204 |
| 6,029,191 A | * | 2/2000 | Kurashima .................. 709/205 |
| 6,058,115 A | * | 5/2000 | Sawyer et al. .............. 370/401 |
| 6,101,545 A | * | 8/2000 | Balcerowski et al. ....... 709/230 |
| 6,111,893 A | * | 8/2000 | Volftsun et al. ............ 370/466 |
| 6,137,473 A | * | 10/2000 | Cortopassi et al. ......... 345/156 |
| 6,144,991 A | * | 11/2000 | England ..................... 709/205 |
| 6,212,160 B1 | * | 4/2001 | Barbieri et al. ............ 370/217 |
| 6,587,125 B1 | * | 7/2003 | Paroz ........................ 345/740 |
| 6,601,094 B1 | * | 7/2003 | Mentze et al. .............. 709/220 |
| 6,629,129 B1 | * | 9/2003 | Bookspan et al. .......... 709/204 |
| 6,668,319 B1 | * | 12/2003 | Newell et al. .............. 713/100 |
| 6,741,610 B1 | * | 5/2004 | Volftsun et al. ............ 370/466 |

OTHER PUBLICATIONS

Streitz, N.A., et al., "DOLPHIN: Integrated Meeting Support across Local and Remote Desktop Environments and LiveBoards," Proceedings of the Conference on Computer Supported Cooperative Work, Chapel Hill, NC, Oct. 22–26, 1994, pp. 345–358.

Meyer, P., "Online help to end–users in a networked environment," *The Electronic Library*, vol. 9, No. 4/5, Aug./Oct. 1991, pp. 251–255.

Boggan, S., et al., "Developing Online Help For windows '95," *Journal of the Society for Technical Communication*, vol. 44, No. 1, First Quarter Feb. 1997, pp. 76–78.

Sunnava, S. V., et al., "Internet Based Interactive Multimedia Transfers and Applications", Proceedings of the 1998 IEEE Southeastcon Conference, Orlando, Florida, Apr. 24–26, 1998, pp. 49–52.

Rogerson, D., "Inside COM," Microsoft Press, 1997, p. 90.

* cited by examiner

*Primary Examiner*—Saleh Najjar
(74) *Attorney, Agent, or Firm*—Woodcock Washburn LLP (57) ABSTRACT

A first computing device is connected to a second computing device over a conventional communication network or other switching device or network using a predetermined communications protocol or a unified protocol. The unified protocol enables remote control of a display device by abstracting out differences in protocols, thereby eliminating the need to develop different interfaces between systems. By implementing the system as COM objects, other available protocols can be dynamically integrated. Upon connection of the first computing device to the second computing device, the screen of the second computing device is displayed on the screen of the first computing device. The first computing device is capable of watching or monitoring the second computing device, or the first computing device can control the second computing device. The first computing device can switch between the watching/monitoring mode and the controlling mode in a reversible or toggleable manner.

32 Claims, 6 Drawing Sheets

SYSTEMS AND METHODS FOR UNIFIED REMOTE CONTROL ACCESS

TECHNICAL FIELD

This invention relates in general to support systems performed by connected computers. More particularly, this invention relates to the access and control of connected computer systems by hiding the details of a particular implementation to allow technology-specific components to plug in.

BACKGROUND OF THE INVENTION

Supporting software products can be a frustrating experience for all involved: the customer, the product support technician and the software developer. Presently, placing a call to the "Technical Support" department of a software development company typically involves a seemingly endless navigation through telephone menus, and, at times, a very long wait to talk to a technician. Then, a customer explains what he sees, and a technician tells the customer what to do and then asks, "Now what do you see?" This process is prone to communication mishaps and miscommunications. Frequently, some critical miscommunication will occur and the entire series of events will have to be repeated.

Similar situations exist in training scenarios. Firstly, physically gathering trainer and trainee in the same physical location can be costly and time-consuming, especially for multi-site companies. Secondly, once a training session is initiated, typically the screen of the trainer's computer is enlarged and projected for the trainees to see. The trainer lectures and points with a laser pointer, for example, and the trainee follows as best he can, trying to keep both the trainer's screen and his own screen in sight at all times. Frequently, the trainee gets lost or strikes the wrong keys or misses a critical navigation and the trainee's screen is no longer the same as the trainer's displayed screen. The session is stopped while the mistake is determined and corrected. If a number of trainees are participating in the session, the other trainees are also typically delayed.

Furthermore, network administrators often are informed of system problems or need to make routine adjustments. Frequently, the administrator must physically travel to the user's desktop to see the malfunction in progress or to make changes directly to the user's system or desktop. Since many companies have several locations or are spread out over an extended physical plant, a considerable amount of time is typically spent in physically transporting personnel to the required location.

Each of these scenarios translates into major expense for businesses. It strains credulity to imagine a company that never needs to train employees. A majority of businesses today have networked computer systems using a number of different commercial software systems and "help desks" are to be found in more and more businesses. In particular, software development companies find product support to be a major expense. As software becomes more and more complex, expenses will increase, and customer and technician frustration will mount.

Remote control technology exists for connecting to and controlling a user's desktop from a remote location. Current remote control technology, however, is not capable of transferring control of a desktop or computing device back and forth between remote users while maintaining a common desktop between the users regardless of underlying platforms. Current remote control technology does not permit a reversible connection in which a mirror image of one user's computing device is displayed on the computing device of another and in which control of one's computing device is transferred to the second user.

Currently, each remote control technology uses its own platform with its own operating system, remote control software and protocol. Examples include Terminal Services® for the Windows® 2000 server, the NetMeeting® remote control used in Win9x and Windows® 2000 Pro and Symantec's PCAnywhere®. Accordingly, different interfaces must be developed for each different operating system and protocol, requiring developers to write code specific to a particular protocol or interface.

Thus, a need exists for an interactive system that overcomes the drawbacks of the prior art and allows a user to remotely access and control the desktop of another user without the necessity of developing a different interface for each protocol and operating system.

SUMMARY OF THE INVENTION

In the present invention, a first computing device is connected to a second computing device over a communication network or other switching device or network using a communications protocol. Upon connection of the first computing device to the second computing device, the screen of the second computing device is displayed on the screen of the first computing device. The first computing device is capable of watching or monitoring the second computing device, or the first computing device can control the second computing device. The first computing device can switch between the watching mode and controlling mode in a reversible or toggleable manner.

The present invention is directed to abstracting out the differences in communication protocols and providing a unified standard for connecting one computing device to another. The present invention determines the type of platform being controlled and uses the appropriate remote control interface to control it. Thus the user has a common "remote desktopping" experience without regard to the user's workstation platform. The present invention can also be adapted to receive (via for example, a plug-in) new interfaces and protocols and automatically operate with the new interfaces and protocols. The present invention provides an advantage of eliminating the need for a developer to write code specific to a particular protocol or interface. In accordance with the present invention, application code can be written to a single unified interface.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE PREFERRED EMBODIMENTS

Overview

Figure 1:
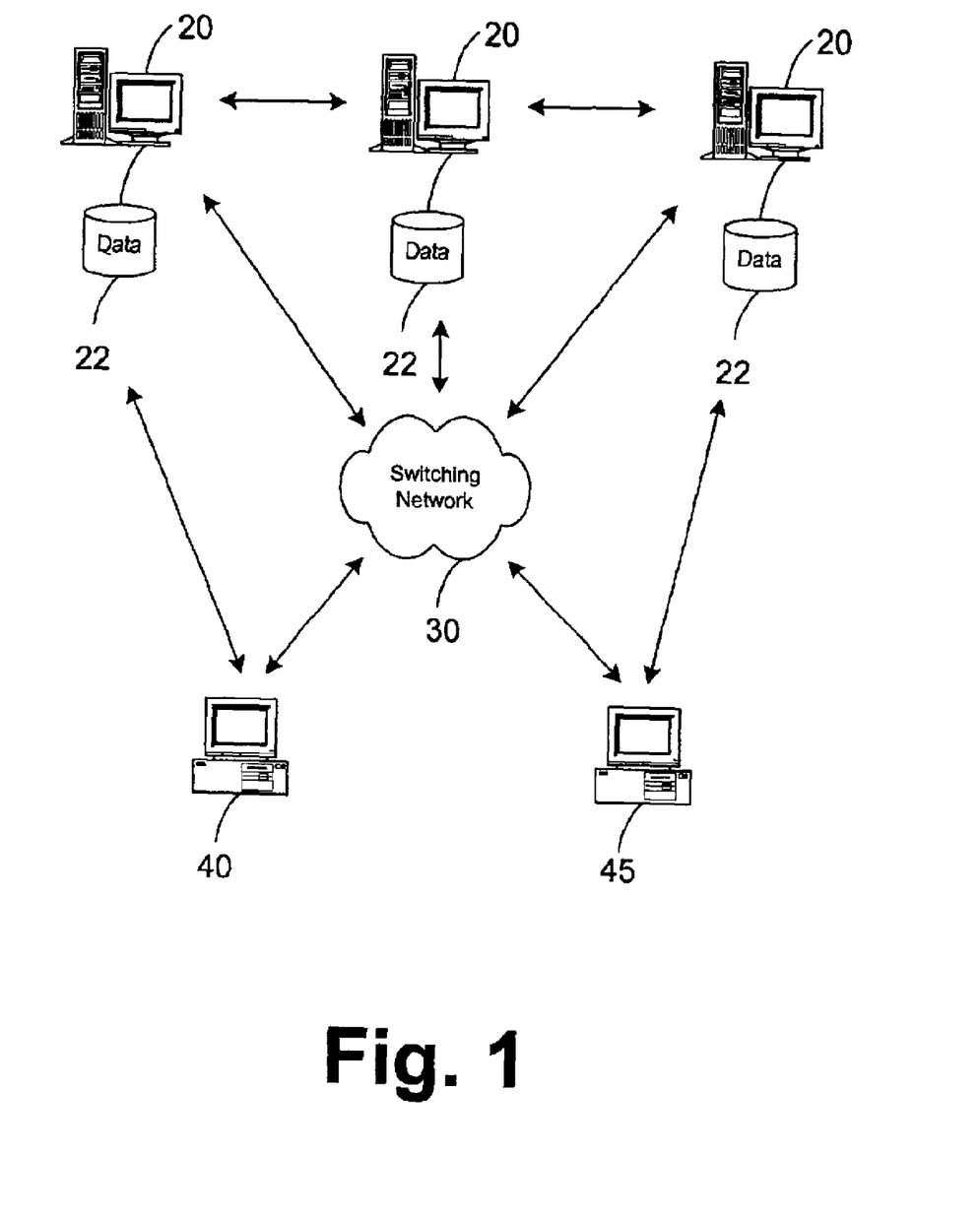
FIG. 1 illustrates a high level example of a distributed computing environment in which the invention may be implemented.

FIG. 1 illustrates a high level example of a distributed computing environment in which the invention may be implemented. A plurality of servers 20, each having memory 22, are interconnected, either directly or through an optional switching network 30. A plurality of clients 40, 45 are connected to the servers 20, either directly or through the optional switching network 30. The clients 40, 45 can also be connected to each other via the network 30 or via the network 30 and the servers 20.

In the present invention, a first computing device 40 is connected to a second computing device 45 or a server 20 using an interface (e.g., a network interface implemented in software) over a conventional communication network or other switching device or network 30 using a communications protocol. The interface is preferably implemented in software and can reside in a server 20, the network 30, in a computing device 40, 45 or be standalone. Although FIG. 1 shows the first computing device 40 connected to the same network as the second computer device 45 it is understood that the present invention encompasses also an environment in which the first and second computing devices are personal computers (PCs) connected to the Internet or devices on different networks connected via the Internet.

After the first computing device 40 is connected to the second computing device 45, the screen contents of the second computing device 45 are displayed at the first computing device 40. The first computing device 40 can then watch or monitor the second computing device 45 or the first computing device 40 can control the second computing device 45. The first computing device 40 can switch between the watching/monitoring mode and controlling mode in a reversible or toggleable manner. It is contemplated that the present invention can also be used to interconnect a computing device (e.g., device 40 or 45) with a server 20, and that access and control is reversibly provided in a similar manner, if desired.

A communications protocol is used to transfer data and other information between the computing devices. A computing device requests a connection with another computing device. The request contains the communications protocol that is desired. If the communications protocol is known (e.g., stored in a library at a server or a computing device), then that communications protocol is used in the subsequent connection and communication. The library can store a plurality of predetermined protocols, and the library can be modified to add, delete or change stored protocols.

In accordance with the present invention, the interface determines the type of platform being controlled and uses the appropriate remote control protocol to control it. For example, a first plug-in implements remote desktopping when the first plug-in remote control is available. The first plug-in interacts with the associated application programming interface in order to manage the state of the server with respect to remote control. A second plug-in implements remote desktopping when the first plug-in remote control is unavailable. The present invention also provides the ability for third parties to plug-in the third-party's remote desktopping technology on the server and the client. Thus the present invention is adapted to receive (via, for example, plug-in) new protocols and to automatically operate with the new protocols.

Additionally, the implementation of the disclosed invention may be wrapped by a COM (Component Object Model) layer, allowing any language which supports COM to access the functions, thus enabling traditional development environments such as Visual Basic, C/C++, etc. to use the present invention. It is additionally contemplated that any standardized component interface abstraction layer can be used in accordance with the present invention to provide a modular, pluggable, standardized abstraction layer. Exemplary implementations include, but are not limited to, Java and CORBA. Thus, the use of component technology enables additional protocols or interfaces to be plugged in dynamically without recompiling the application on the client or on the server.

The foregoing and other aspects of the present invention will become apparent from the following detailed description of the invention when considered in conjunction with the accompanying drawings.

Computing Environment

As described above, FIG. 1 illustrates a high level example of a distributed computing environment in which the invention may be implemented. Each of the clients and servers are described in further detail below.

Figure 2:
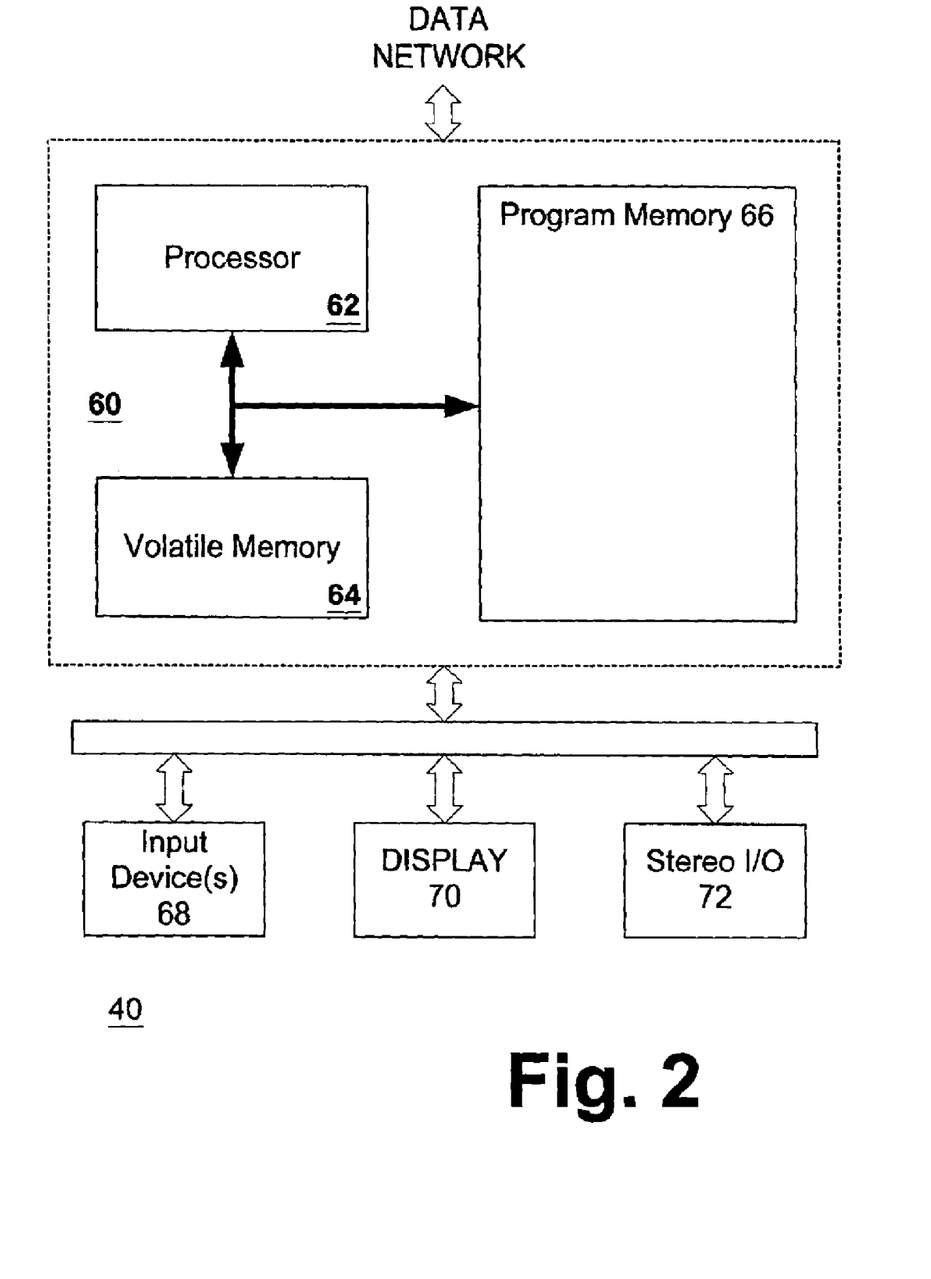
FIG. 2 shows an exemplary configuration of a client implemented as a computer.

FIG. 2 shows an exemplary configuration of a client (e.g., client 40) implemented as a computer or computing device. This configuration is also appropriate for a server, though it is discussed below with respect to a client. The client 40 includes a central processing unit 60 having a processor 62, volatile memory 64 (e.g., random access memory (RAM)), and program memory 66 (e.g., read only memory (ROM), flash, disk drive, floppy disk drive, CD-ROM, and the like). The client 40 has one or more input devices 68 (e.g., keyboard, mouse, etc.), a computer display 70 (e.g., VGA, SVGA), and a stereo I/O 72 for interfacing with a stereo system.

The client 40 runs an operating system that supports multiple applications. The operating system is preferably a multitasking operating system that allows simultaneous execution of multiple applications. The operating system employs a graphical user interface windowing environment that presents the applications or documents in specially delineated areas of the display screen called "windows." One preferred operating system is a Windows® brand operating system sold by Microsoft Corporation, such as Windows® 95 or Windows® NT or other derivative versions of Windows®. It is noted, however, that other operating systems that provide windowing environments may be employed, such as the Macintosh operating system from Apple Computer, Inc. and the OS/2 operating system from IBM.

Figure 3:
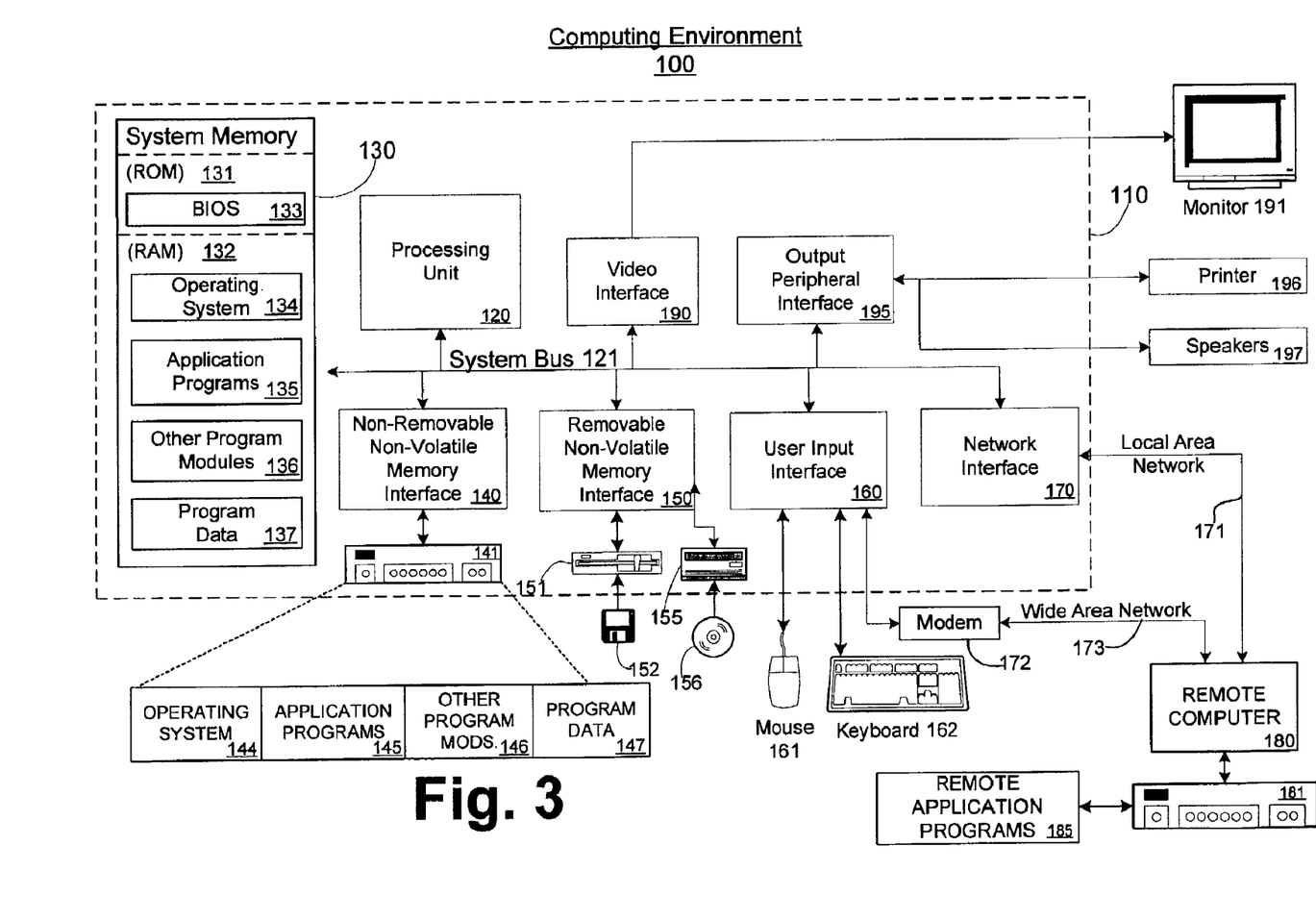
FIG. 3 is a block diagram showing an exemplary computing environment in which aspects of the invention may be implemented.

FIG. 3 illustrates a more detailed example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 3, an exemplary system for implementing the invention includes a general purpose computing device in the form of a computer 110. Each server and client can incorporate the computer 110 in the environment 100. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3 illustrates operating system 134, application programs 135, other program modules 136, and program data 137.

The computer 110 may also include other removable/non-removable, volatile/nonvolatile computer storage media. By way of example only, FIG. 3 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 140 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 3, provide storage of computer readable instructions, data structures, program modules and other data for the computer 110. In FIG. 3, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 3. The logical connections depicted in FIG. 3 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on memory device 181. It will be appreciated that the network connections shown are exemplary and other means of establishing a communications link between the computers may be used.
Accessing A First Device From A Second Device In accordance with the present invention, the interface determines the type of platform being controlled and uses the appropriate remote control protocol to control it. For example, when used with the Terminal Services® Remote Desktop Protocol (TSRDP) Plug-In and the NetMeeting® Plug-In, the TSRDP may implement remote desktopping when Terminal Services® remote control is available. The TSRDP Plug-In interacts with the Terminal Services® application programming interface in order to manage the state of the server with respect to remote control. The NetMeeting® Plug-In then implements remote desktopping when Terminal Services® is unavailable. The present invention also provides the ability for third parties to plug-in the third-party's remote desktopping technology on the server and the client. Thus the present invention is adapted to receive (via, for example, plug-in) new protocols and to automatically operate with the new protocols.

As described above with respect to FIG. 1, after the first computing device 40 is connected to the second computing device 45 (or server 20, although the example described herein is directed to the two computing devices 40, 45) via an interface (e.g., a network interface implemented in software and residing in a server 20, the network 30, in a computing device 40, 45, or standing alone), a server 20, and a network 30, for example, the screen contents of the second computing device 45 are displayed at the first computing device 40. The first computing device 40 can then watch or monitor the second computing device 45, or the first computing device 40 can control the second computing device 45. The first computing device 40 can switch between the watching/monitoring mode and controlling mode in a reversible or toggleable manner.

Examples of well known computing devices include but are not limited to personal computers, server computers, hand-held or laptop devices, multiprocessor systems, microprocessor-based systems, set top boxes, programmable consumer electronics, network PCs, minicomputers, mainframe computers, or desktops. Although FIG. 1 depicts the first 40 and second computing devices 45 as clients on the same network, 10, the first 40 and second computing devices 45 can be connected to different networks and establish a connection through the Internet. Likewise, the first 40 and second computing devices 45 can be PCs communicating via the Internet. Likewise, one computing device could be a PC connected to the Internet and the other device could be a networked desktop, also connected to the Internet. These examples are given by way of illustration and should not be construed to limit the invention to only these environments.

More particularly, in the case where the first computing device 40 is to communicate with the second computing device 45, the second computing device 45 sends a request to the network or other interface 30 to initiate a connection with the first computing device 40 using whatever messaging system the second computing device 45 supports. The request includes identification of a desired communications protocol. Interface 30 ascertains which protocol is required and automatically uses (plugs-in) that protocol. For example, if TSRDP and NetMeeting® are being used in accordance with the present invention, the TSRDP Plug-In manages server 20 and devices 40, 45 when Terminal Services® remote control is available, the NetMeeting® Plug-In manages server 20 and devices 40, 45 when Terminal Services® is unavailable and a third-party's plug-in manages server 20 and devices 40, 45 when the third-party's remote control is used. In a preferred embodiment the plug-ability of the interface 30 is achieved using a COM interface, although it should be understood that any appropriate implementing technology including but not limited to Java or CORBA could be used without violating the spirit and scope of the invention.

The interface 30 forwards the request for connection to the first computing device 40. This request for connection initiates a session using either the desired communication protocol if it is known by the first computing device, server, or network or, if it is not known, a legacy protocol that has been previously generated and stored in a memory Applications that have been inherited from languages, platforms, and techniques earlier than current technology are called legacy applications. Many companies are migrating their legacy applications to new technologies that utilize open or standard programming interfaces, making it easier to update applications without having to rewrite them entirely and will allow use of the applications on any operating system. A session is defined as the period in which the second computing device 45 is available for connection by the first computing device 40. A session remains active even after the calling application exits. The first computing device 40 receives the request and establishes a connection to the second device 45. Preferably, before the connection is established, both the first computing device 40 and the second computing device 45 are authenticated using authentication procedures that are well known in the art.

Upon connection of the first computing device 40 to the second computing device 45 the screen contents (e.g., a screen shot) of the second computing device 45 are displayed on the display of the first computing device 40. The first computing device 40 is capable of displaying the screen contents of a second computing device 45 or the first computing device 40 is capable of displaying the screen contents of the second computing device 45 and controlling the second computing device 45 in a reversible connection. By "reversible connection" it is meant that the first computing device 40 can merely "listen", which means to watch or monitor the second computing device 45 (e.g., while the user of the second computing device 45 works on his computing device), or the first computing device 40 can enter "control" mode, in which the first computing device 40 acts upon and controls the second computing device 45, as well. The first computing device 40 can switch from "listen" to "control" mode in a reversible or toggleable manner.

If the first computing device 40 is in listen mode and wishes to enter into control mode, the first computing device 40 sends a request to enter into control mode to the second computing device 45. Upon receiving permission from the second computing device 45 the first computing device 40 enters control mode. Upon completion of the requested operation, the first computing device 40 relinquishes control and terminates the session.

According to another aspect of the invention, first computing device 40 and second computing device 45 are connected to server 20 via an interface such as a network interface implemented in software and residing in a server 20. In accordance with this aspect of the present invention, server 20 may send display information to first computing device 40 and second computing device 45. Subsequently, first computing device 40 may request contents of the display of the second computing device 45, and monitoring and control thereof.

Figure 4:
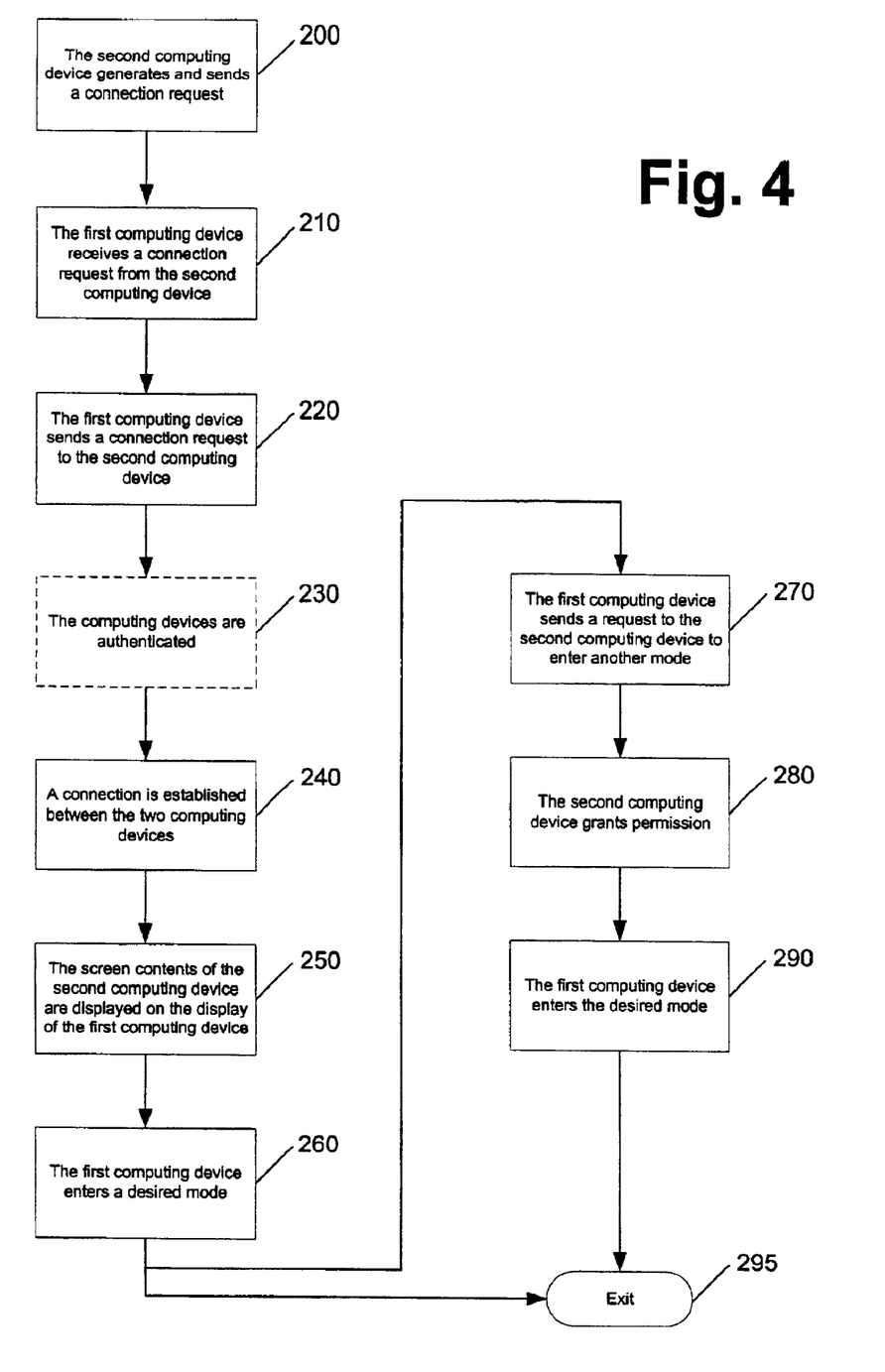
FIG. 4 is a flow chart of an exemplary method in accordance with the present invention.

FIG. 4 is a flow chart of an exemplary method in accordance with the present invention. At step 200, a computing device (e.g., the second computing device 45 of FIG. 1), generates and sends a connection request to another computing device (e.g., the first computing device 40 of FIG. 1) via an interface (e.g., network 30 and/or server 20 of FIG. 1) to initiate a session using a messaging system that the second computing device supports. The request can take the form of a help ticket or other message. The request includes a desired communications protocol. A session is defined as that time during which the second device is available for connection to the first device. Sessions can be supported by Microsoft's NetMeeting® or Terminal Services®, for example, or by any other remote control technology. Desirably, the session remains active even after the calling application has exited.

At step 210, the first computing device receives the request and subsequently requests a connection to the second device at step 220. Optionally, before the connection is established, both the first computing device and the second computing device are authenticated at step 230 using conventional authentication procedures.

After authentication, the first computing device connects to the second computing device using a communications protocol, at step 240. A unified communications protocol is retrieved from a memory or storage device and used in the connection if the desired communications protocol from the request is unknown. If the desired communications protocol is known (e.g., it is stored in a library of predetermined protocols), then the connection is made using the desired communications protocol.

Upon connection of the first computing device to the second computing device at step 240, the screen contents or display of the second computing device are displayed on the screen of the first computing device at step 250. At this point, at step 260, the first computing device enters its desired mode (e.g., a "listen" mode).

The first computing device is capable of displaying or controlling the second computing device in a reversible connection. By "reversible connection" it is meant that the first computing device can "listen" (i.e., watch or monitor while the user of the second computing device works on his computing device) or the first computing device can enter "control" mode in which the first computing device acts upon and controls the second computing device. The first computing device can switch from "listen" to "control" mode in a reversible or toggleable manner.

If the first computing device is in listen mode (e.g., at step 260 in FIG. 4) and then seeks to enter into control mode, at step 270, the first computing device sends a request to enter into control mode to the second computing device. The second computing device grants permission at step 280. Upon receiving permission from the second computing device, the first computing device enters control mode at step 290. If permission is not granted to switch modes, the first computing device remains in the initial mode (e.g., in this case, the listen mode). Moreover, if the first computing device did not request a mode switch, processing remains at step 260 until termination at step 295.

In control mode, the first computing device is capable of controlling the second computing device. Optionally, the user of the second computing device is able to see what the first computing device is doing or alternately, the screen of the second computing device is blanked. The first computing device can then transfer control of the second computing device to another user, if desired. Upon completion of the requested operation, the first computing device relinquishes control at step 295 and terminates the session, or optionally, returns to the initial mode (e.g., in this case, the listen mode).

Thus it is seen that the present invention includes an interactive system that builds on and expands upon available remote desktop and messaging systems technology to provide messaging and access to and control of a computing device such as an end-user desktop, for example, from any remote site.

The systems and methods of the present invention can be embodied in an interactive "help desk" system. In accordance with the present invention, the help desk would be able to view and/or control the client system. According to another aspect of the invention, the remote control of the second device is passed from one device to another (e.g., one help desk technician passes the remote control from his computing device to another help desk technician's computing device).

More particularly, in an embodiment of the invention incorporated into a help desk scenario, a client (e.g., device 45 in FIG. 1) sends a message to the help desk (e.g., device 40) requesting assistance. The message is sent using whatever messaging system the client has. Basic information about the client device 45 can be sent along with the request for help message. A help ticket or request is generated and a message is routed to a technician at the help desk or technician's desktop. After preferred authentication procedures are completed, authenticating both client and technician, the technician requests a connection to the client's device 45 (i.e., the client desktop). Upon receiving permission, a connection is established between the two desktops using either a predetermined communications protocol or a unified protocol, described further below.

In accordance with the present invention, the help desk technician at his desktop (e.g., device 40) is able to view and/or control the client system at the client desktop (e.g., device 45). After the connection is made, the technician's desktop 40 mirrors the desktop of the client 45. The technician can now observe exactly what is happening on the client's desktop 45. The technician at desktop 40 can request permission to control the client's desktop 45. When permission to control the client's desktop 45 is received, the technician can then perform the desired functions. Upon completion, control is returned to the client's desktop 45. The help session is then ended.

Moreover, the systems and methods of the present invention can be embodied in a teaching scenario, whereby a remote teacher and student could interact and both teacher and student would experience substantially identical desktops. In this embodiment, control is transferred between the computing devices of the teacher and the student.

Furthermore, the systems and methods of the present invention can be embodied in network administration, whereby a network administrator could implement changes on a remote desktop from the administrator's location, eliminating the necessity of traveling to the client location.

As another example, a user can send a message requesting assistance to a technical support department of a software development company. Upon receipt of the message, the support technician can request permission to control the desktop of the user requesting assistance. Upon receipt of permission to access the desktop, the connection is established. Upon connection to the requested party, the desktop of the user can be displayed upon the desktop of the support technician and optionally, controlled by the support technician.

Multiple different modes of control are contemplated in accordance with the present invention. One mode is the control mode, in which what is happening on a first device (e.g., desktop 1) is also performed and displayed on another device (e.g., desktop 2). In another type of control mode, desktop 2 is blanked, so that desktop 2 cannot view what desktop 1 is doing to desktop 2. In a listen mode, control is retained by desktop 2 and desktop 1 (e.g., the technician's desktop) mirrors what is happening on desktop 2.

According to another aspect of the invention, the remote control of the second device is passed from one system to another (e.g., a technician at desktop 1 passing control of desktop 2 to another technician on desktop 3 for additional assistance).

Protocol Unification

The communication protocol used between the two computing devices can be a standard communication protocol such as those used by Microsoft's NetMeeting® or Terminal Services® or Symantec's PCAnywhere® or another communication protocol, now existing or one developed in the future. Known protocols are stored in a storage device or memory, such as a protocol library residing on a server. The protocol library can be modified to add, delete, or change protocols residing therein.

In accordance with the present invention, the computing device receiving a connection request determines the type of platform being controlled (i.e., determines the communications protocol to be used) and uses that protocol in communications, enabling users to have a common "remote desktopping" experience without regard to the user's workstation platform. This objective is achieved by integrating current technologies and enabling third-party technologies to be plugged-in.

COM (Component Object Model) is technology developed to enable one piece of software to communicate with another piece of software using a vtable (virtual function table) to define methods. In COM, all interfaces have unique identifiers. The interfaces define the functionality and the objects, once instantiated, define functionality. The implementation of the disclosed invention may be wrapped by a COM layer, allowing any language which supports COM to access the functions, thus enabling traditional development environments such as Visual Basic, C/C++, etc. to use the present invention. Additionally, the use of component technology enables additional protocols or interfaces to be plugged in dynamically without recompiling the application on the client or on the server. Using COM, objects (or classes) and their methods and associated data are compiled into binary executable modules, with a dynamic link library or EXE file name suffix.

In a preferred embodiment the plug-ability of the interface is achieved using a COM interface, although it should be understood that any appropriate implementing technology including but not limited to Java or CORBA could be used without violating the spirit and scope of the invention.

Alternately, if the communication protocol to be used is not recognized by the system (i.e., the communication protocol is not stored as a predetermined protocol in the protocol library), then the system retrieves a unified protocol for use in the subsequent communications. The unified protocol can be stored in a predetermined protocol library or another memory or storage device.

Figure 5:
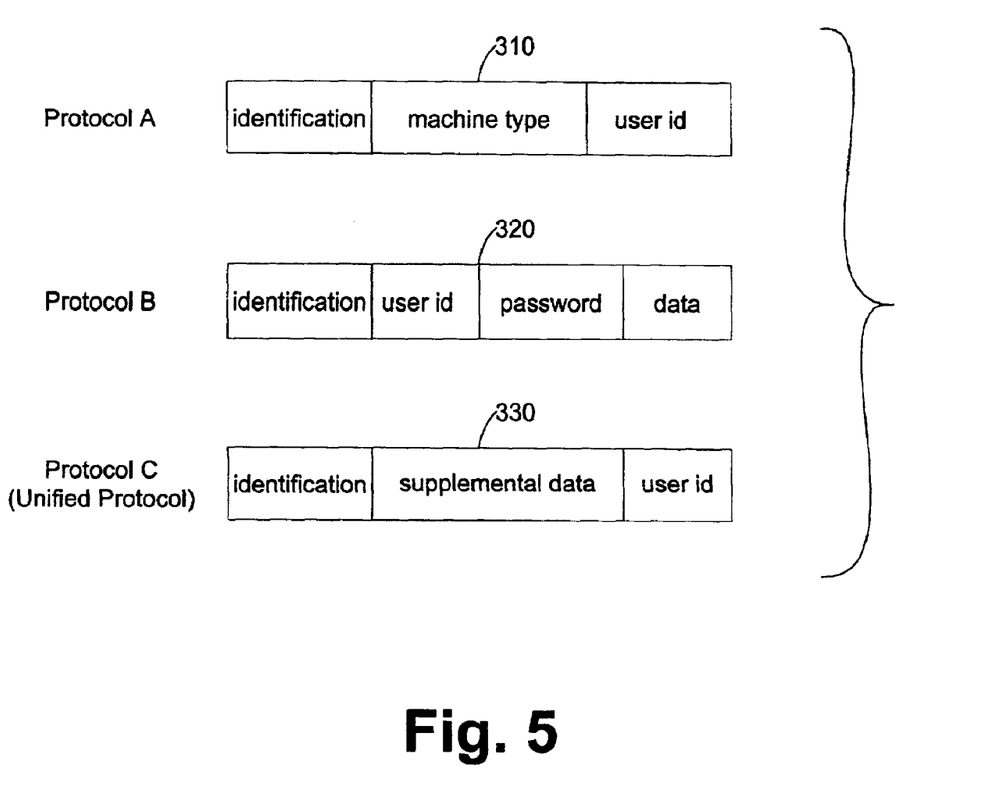
FIG. 5 is a schematic diagram showing an exemplary abstracted protocol in accordance with the present invention.

A unified protocol is created by abstracting common elements out of the protocol(s) that are desirably used by the computing devices, and then generating a protocol using the common elements. FIG. 5 is a schematic diagram showing an exemplary abstracted protocol (protocol C), and the protocols A and B from which common elements were extracted, in accordance with the present invention. In FIG. 5, a record 310 of protocol A comprises three fields: an identification field, a machine type field, and a user id field. A record 320 of protocol B comprises four fields: an identification field, a user id field, a password field, and a data field. Protocol C represents the unified protocol. Protocol C is generated by extracting the common elements from protocols A and B and inserting them into a new record 330 with any additional fields needed to communicate. In this manner, if a first computing device is designed to run on a platform supporting protocol A and a second computing device is designed to run on a platform supporting protocol B, the two computing devices can still communicate with each other using a unified protocol comprising protocol A and B's common elements. Thus, systems running different operating systems and protocols can communicate with each other without the need for a unique interface to be developed for each different combination of operating system and protocol ahead of time and off-line.

Figure 6:
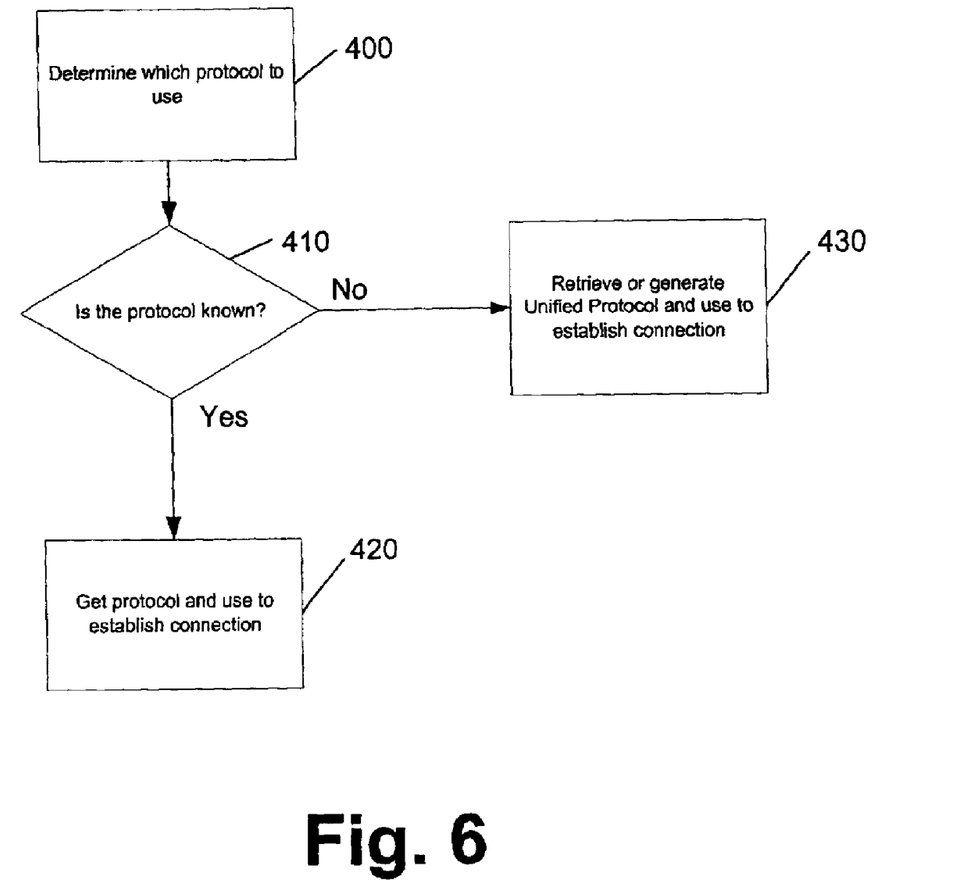
FIG. 6 is a flow chart of another exemplary method in accordance with the present invention.

FIG. 6 is a flow chart of an exemplary method of determining the protocol for use in accordance with the present invention. At step 400, the computing device receiving the initial connection request (e.g., the first computing device at step 210 in FIG. 4) determines the protocol sought to be used by the device sending the request (e.g., the second computing device).

At step 410, the computing device (referred to in this example as the first computing device) determines if the protocol is one of the predetermined protocol(s) stored in a library of protocols. If so, then that protocol is used to establish the connection, at step 420, and communication proceeds. However, if the protocol is not one of the predetermined protocols stored in the library, then a unified protocol is retrieved at step 430, by abstracting common elements out of the protocol(s) that are desirably used by the computing devices and using the common elements in a newly created protocol. This unified protocol may be generated and incorporated into the invention by a developer having knowledge of the characteristics of the unrecognized protocol. Similarly, in an alternate embodiment, a third-party, e.g., the designer of the unrecognized protocol, provides information to be incorporated into the infrastructure of the interface of the invention by differentiating between and providing information about what is common and what is unique about the communication protocol relative to the interface of the invention. In yet another alternate embodiment, the unified protocol may be generated by a module specially created to extract common elements out of the unrecognized protocol, in which case, the computing device receiving the connection request acts as a protocol generator as well as an element extractor. After retrieving the previously generated or received unified protocol, the unified protocol is then used to establish the connection between the two devices, and communication proceeds.

Thus, the present invention abstracts out the differences in communication protocols and provides a unified standard for connecting one computing device to another. According to one aspect of the present invention, a single remote control interface is provided in a computing device that is requested to connect by and to another computing device. The remote control interface extracts elements that are common to communication protocols, such as identification and user id, discards the other non-common elements, and generates a new, common "unified" protocol based on the common elements. In this manner, remote control capability is provided for systems running different operating systems and protocols, eliminating the need to develop different interfaces for the various operating systems and protocols. Hence, the present invention provides an advantage of eliminating the need for a developer to write code specific to a particular protocol or interface. Thus, in accordance with the present invention, application code can be written to a single unified interface.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the versioning functionality of the present invention.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed is:

1. A method of accessing a first computing device from a second computing device comprising:

connecting to a first computing device from a second computing device using a communication protocol, comprising determining if the communication protocol is one of a predetermined plurality of protocols, and if the communication protocol is one of the predetermined plurality of protocols, using the communication protocol in establishing the connection between the first computing device and the second computing device, and if the communication protocol is not one of the predetermined plurality of protocols, using a unified communications protocol in establishing the connection between the first computing device and the second computing device; and controlling one of the first computing device and the second computing device from the other of the first computing device and the second computing device in a reversible connection.

2. The method of claim 1, further comprising receiving an instruction to reverse the connection and using the one computing device to control the other computing device.

3. The method of claim 1, wherein connecting to the first computing device comprises:

sending a connection request from the first computing device to the second computing device;

receiving the connection request at the second computing device; and establishing a connection between the first and second computing devices responsive to the connection request.

4. The method of claim 1, further comprising authenticating the first computing device.

5. The method of claim 1, further comprising entering one of a listening mode and a control mode at the first computing device and entering the other of the listening mode and the control mode at the second computing device.

6. The method of claim 5, further comprising toggling from the listening mode to the control mode at one of the first computing device and the second computing device, and toggling from the control mode to the listening mode at the other of the first computing device and the second computing device.

7. The method of claim 5, further comprising reversibly toggling the first computing device between the listening mode and the control mode and reversibly toggling the second computing device between the listening mode and the control mode.

8. The method of claim 5, further comprising requesting permission from one of the computing devices to the other of the computing devices to toggle from one of the listening mode and the control mode to the other mode.

9. The method of claim 1, wherein controlling one of the first computing device and the second computing device using the other of the first computing device and the second computing device comprises receiving an input at the other computing device and sending the input to the one device, the one device processing the input.

10. The method of claim 1, further comprising releasing control responsive to an input received at one of the first computing device and the second computing device.

11. The method of claim 1, wherein connecting to the first computing device using the second computing device is responsive to one of a help request, a training session initiation, and a network administration task.

12. A system for accessing a first computing device from a second computing device comprising:

a communications network for two-way communication between the first computing device and the second computing device using a communication protocol;

a reversible controller which allows control of one of the first computing device and second computing device, using the other of the first computing device and second computing device;

a protocol generator that determines if the communication protocol used to connect the first computing device to a second computing device is one of a predetermined plurality of protocols, and if the communication protocol is not one of the predetermined plurality of protocols, one of retrieves and generates a unified protocol and uses the unified protocol in establishing the connection between the first computing device and the second computing device.

13. The system of claim 12, wherein the connection is a reversible connection.

14. The system of claim 12, further comprising a transmitter for sending an instruction to one of the first computing device and second computing device, from the other of the first computing device and second computing device.

15. The system of claim 14, further comprising a receiver adapted to receive the instruction sent to the one of the first computing device and second computing device, from the other of the first computing device and second computing device.

16. The system of claim 14, wherein the communications network is capable of establishing a connection between the first and second computing devices responsive to the received instruction.

17. The system of claim 14, wherein the controller controls the one of the first computing device and second computing device, by the other of the first computing device and second computing device responsive to the received instruction.

18. The system of claim 12, wherein the first computing device and the second computing device each comprise a listening mode and a control mode, and one of the first computing device and second computing device enters into one of the listening or control modes and the other of the first computing device and second computing device enters into the other of the listening or control modes.

19. The system of claim 12, wherein the one of the first computing device and the second computing device is reversibly toggleable between a listening and a control mode and the other of the first computing device and second computing device enters into the other of the listening or control modes.

20. The system of claim 19, wherein the controller toggles from the listening to the control mode at the one of the computing devices and from control mode to the listening mode at the other of the computing devices.

21. The system of claim 12, further comprising an element extractor that extracts at least one element from the communication protocol, the additional protocol based on the at least one element.

22. A computer-readable-medium having computer-executable instructions for performing acts comprising:

connecting to a first computing device using a second computing device using a communication protocol, comprising determining if the communication protocol is one of a predetermined plurality of protocols, and if the communication protocol is one of the predetermined plurality of protocols, using the communication protocol in establishing the connection between the first computing device and the second computing device, and if the communication protocol is not one of the predetermined plurality of protocols, using a unified communications protocol in establishing the connection between the first computing device and the second computing device; and controlling one of the first computing device and the second computing device using the other of the first computing device and the second computing device in a reversible connection.

23. The computer-readable-medium of claim 22, having further computer-executable instructions for receiving an instruction to reverse the connection and for using the one computing device to control the other computing device.

24. The computer-readable-medium of claim 22, having further computer-executable instructions for performing acts comprising:

sending a connection request from the first computing device to the second computing device;

receiving the connection request at the second computing device; and establishing a connection between the first and second computing devices responsive to the connection request.

25. The computer-readable-medium of claim 22, having further computer-executable instructions for authenticating at least one of the first computing device and the second computing device.

26. The computer-readable-medium of claim 22, having further computer-executable instructions for entering one of a listening mode and a control mode at the first computing device and entering the other of the listening mode and the control mode at the second computing device.

27. The computer-readable-medium of claim 26, having further computer-executable instructions for toggling from the listening mode to the control mode at one of the first computing device and the second computing device, and toggling from the control mode to the listening mode at the other computing device.

28. The computer-readable-medium of claim 22, having further computer-executable instructions for reversibly toggling the first computing device between a listening mode and a control mode and reversibly toggling the second computing device between the control mode and the listening mode.

29. The computer-readable-medium of claim 22, having further computer-executable instructions for requesting permission from one of the computing devices to the other of the computing devices to toggle from one of the listening mode and the control mode to the other mode.

30. The computer-readable-medium of claim 22, having further computer-executable instructions for controlling one of the first computing device and the second computing device using the other computing device comprising performing the acts of:

receiving an input at the other computing device;

sending the input to the one device; and processing the input at the one device.

31. The computer-readable-medium of claim 22, having further computer-executable instructions for releasing control responsive to an input received at one of the first computing device and the second computing device.

32. The computer-readable-medium of claim 22, having further computer-executable instructions for connecting to the first computing device using the second computing device, responsive to an instruction comprising one of a help request, a training session initiation, and a network administration task.

* * * * *